United States Patent
Baikov et al.

(10) Patent No.: US 7,587,425 B2
(45) Date of Patent: Sep. 8, 2009

(54) METHOD AND SYSTEM FOR GENERATING AND EMPLOYING A DYNAMIC WEB SERVICES INVOCATION MODEL

(75) Inventors: Chavdar S. Baikov, Sofia (BG); Vladimir S. Savchenko, Sofia (BG); Ivan Markov Markov, Sofia (BG)

(73) Assignee: SAP AG, Walldorf (DE)

( * ) Notice: Subject to any disclaimer, the term of this patent is extended or adjusted under 35 U.S.C. 154(b) by 284 days.

(21) Appl. No.: 11/413,789

(22) Filed: Apr. 28, 2006

(65) Prior Publication Data

US 2007/0255717 A1 Nov. 1, 2007

(51) Int. Cl.
*G06F 17/30* (2006.01)

(52) U.S. Cl. ........................ 707/104.1; 707/1

(58) Field of Classification Search ............. 707/104.1, 707/1, 100, 102; 709/250; 719/328
See application file for complete search history.

(56) References Cited

U.S. PATENT DOCUMENTS

| | | | |
|---|---|---|---|
| 5,721,925 A | 2/1998 | Cheng et al. | |
| 6,061,692 A | 5/2000 | Thomas et al. | |
| 6,266,673 B1 | 7/2001 | Hong et al. | |
| 6,393,424 B1 | 5/2002 | Hallman et al. | |
| 6,988,025 B2* | 1/2006 | Ransom et al. | 700/295 |
| 2003/0070006 A1 | 4/2003 | Nadler et al. | |
| 2003/0181196 A1 | 9/2003 | Davidov | |
| 2004/0045005 A1 | 3/2004 | Karakashian | |
| 2004/0111525 A1 | 6/2004 | Berkland et al. | |
| 2004/0117407 A1 | 6/2004 | Kumar et al. | |
| 2004/0167896 A1 | 8/2004 | Eakin | |
| 2004/0216086 A1 | 10/2004 | Bau | |
| 2005/0044197 A1 | 2/2005 | Lai | |
| 2005/0050228 A1* | 3/2005 | Perham et al. | 709/246 |
| 2005/0060372 A1 | 3/2005 | DeBettencourt et al. | |
| 2006/0123039 A1 | 6/2006 | Scheuerle et al. | |
| 2006/0136419 A1 | 6/2006 | Brydon et al. | |
| 2006/0200739 A1 | 9/2006 | Bhatia et al. | |
| 2006/0242111 A1 | 10/2006 | Goldstein | |
| 2006/0248087 A1 | 11/2006 | Agrawal et al. | |
| 2006/0265344 A1 | 11/2006 | Woods | |
| 2006/0294134 A1 | 12/2006 | Berkhim et al. | |
| 2007/0073697 A1 | 3/2007 | Woods | |
| 2007/0100834 A1 | 5/2007 | Landry et al. | |
| 2007/0150478 A1 | 6/2007 | Cho et al. | |
| 2007/0288520 A1 | 12/2007 | Hatanaka et al. | |
| 2008/0005155 A1 | 1/2008 | Soma et al. | |
| 2008/0059450 A1 | 3/2008 | Joseph et al. | |

OTHER PUBLICATIONS

Stephen J.H. Yang, Norman W.Y. Shao, Blue C.W. Lan, and Irene Chen, An Ontology Based Content Model for Web Services, Description, 2004, pp. 1-8, IEEE.*

"6570P375EP EP Application No. 07008350.6-1225 Extended European Search Report", (Sep. 4, 2007).

(Continued)

*Primary Examiner*—Cheryl Lewis
(74) *Attorney, Agent, or Firm*—Schwegman, Lundberg & Woessner, P.A.

(57) ABSTRACT

A system and method are provided to generate a dynamic web services invocation model. In one embodiment, a first metadata and a second metadata are extracted from description content of a Web Service Definition Language (WSDL) file. The first metadata and the second metadata are inspected. A web service is invoked via a dynamic web services invocation model.

7 Claims, 13 Drawing Sheets

OTHER PUBLICATIONS

Ballinger, Keith, et al., "Web Services Metadata Exchange (WS-MetadataExchange)", [*Online*] httpL//specs.xmlsoap.org/ws/2004/09/mex/WS-MetadataExchange0904.pdf, (Sep. 2004), whole document.

USPTO, "6570P375 OA Mailed Apr. 16, 2008 for U.S. Appl. No. 11/413,361", (Apr. 16, 2008), whole document.

Vinoski, Steve, "WS-Addressub Netadata", *IEEE Internet Computing* [*online*], URL:www.ieee.org, (May 5 thru Jun. 5), 90-93.

Yang, S J., et al., "An Ontology Based Content Model for Web Services Description", *Services Computing, 2004. (SCC 2004). Proceedings. 2004 IEEE International. Conference on Shanghai, China* Sep. 15-18, 2004 Piscataway, NJ, USA, *IEEE*, 245-252.

*Non-Final Office Action for* U.S. Appl. No. 11/413,809 Mailed Dec. 11, 2008, 17 pages.

"USPTO, 6570P375 OA Mailed Apr. 16, 2008 for U.S. Appl. No. 11/413,361", (Apr. 16, 2008), Whole Document.

Shalloway, Alan, et al., ""Design patterns explained: a new perspective on object-oriented design"", Addison-Wesley, (2002), Whole Document.

USPTO, "6570P375 FOA Mailed Oct. 27, 2008 for U.S. Appl. No. 11/413,361", (Oct. 27, 2008), Whole Document.

* cited by examiner

METHOD AND SYSTEM FOR GENERATING AND EMPLOYING A DYNAMIC WEB SERVICES INVOCATION MODEL

FIELD

Embodiments of the invention generally relate to the field of web services. More particularly, the embodiments of the invention relate to generating and providing a dynamic web services invocation model via a core web services framework.

BACKGROUND

Efforts are being made to more easily conduct business in a web-based environment. "Web Services" is loosely understood to mean the ability to discover and conduct business in a web-based environment. For example, a user (e.g., a web-based application or person with a web browser) may: 1) search through an online registry of businesses and/or services; 2) find a listing in the registry for web based access to a service that that the user desires to have performed; and then, 3) engage in a web based business relationship with the service application including the passing of relevant information (e.g., pricing, terms, and conditions) over the network. In other words, web services generally refer to offerings of services by one application to another via the World Wide Web.

Given the nature and use of web services and the rapid increase in their demand, interoperability of web services across clients and servers is becoming increasingly important and cumbersome. Some attempts have been made to achieve interoperability across a wide range of platforms and runtimes. For example, using open standards like eXtensible Markup Language (XML), Simple Object Access Protocol (SOAP), Web Services Description Language (WSDL), and Universal Description, Discovery, and Integration (UDDI), some interoperability has been achieved.

FIG. 1 illustrates a prior art web services platform 100. The platform 100 shows various XML-related standards 102-110 that are used in connection with web services to attempt interoperability. The illustrated standards include XML Namespaces 102, similar to Java package names, to provide syntax for data representation in portable format. SOAP 104 refers to a standard packaging format for transmitting XML data between applications over a network. XML schema 106 refers to the World Wide Web Consortium (W3C) schema specification for XML documents. WSDL 108 refers to the standard used for describing the structure of XML data that is exchanged between systems using SOAP 104. Finally, UDDI 110 refers to a standard SOAP-based interface for web services registry and defines a set of web services operations and methods that are used to store and search information regarding web services applications.

However, the open standards are not evolving fast enough to keep up with the increasing demand for web services and needs of additional flexibility and control on the client-side. One of the problems today is the convoluted relationships and mappings between relevant standards. With conventional web services modeling applications and tools, neither the interoperability nor the client-side flexibility are sufficiently achieved because of the limitation in use of web services metadata and conventional separation of standards, models, and entities for web services (WS) and web services client (WSC). For example, Java application programming interface (API) for Extensible Markup Language (XML)-based Remote Procedure Call (RPC) (JAX-RPC), such as JAX-RPC 1.1, does not provide for loading and describing of dynamic web services interfaces, data access, and object manipulation. Furthermore, its metadata hides important web service details and is not suitable for building specialised web service applications.

SUMMARY

A system and method are provided to generate a dynamic web services invocation model. In one embodiment, a first metadata and a second metadata are extracted from description content of a Web Service Definition Language (WSDL) file. The first metadata includes an interface metadata, while the second metadata includes a type metadata. The first metadata and the second metadata are inspected. A web service is invoked via a dynamic web services invocation model.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
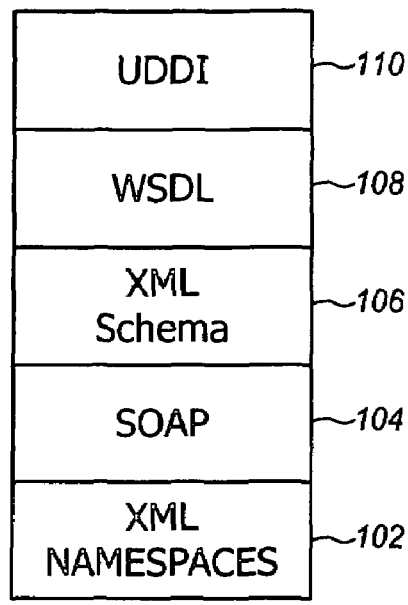
FIG. 1 illustrates a prior art web services platform.
Figure 2:
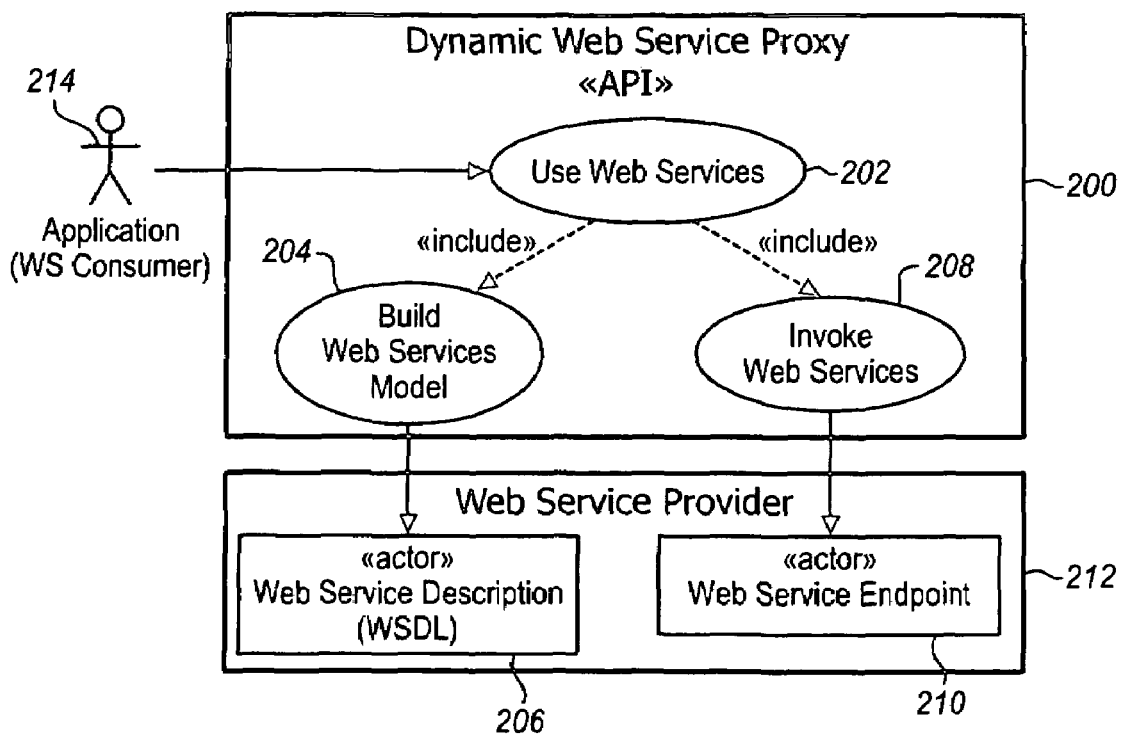
FIG. 2 illustrates an embodiment of a use case for a dynamic web service proxy.

FIG. 2 illustrates an embodiment of a use case for a dynamic web service proxy 200. The illustrated dynamic web service proxy (dynamic proxy) 200 describes a dynamic web service proxy API (dynamic proxy API) and is be provided within a core web service framework. In one embodiment, dynamic proxy 200 is dynamic in nature and this dynamic nature of dynamic proxy 200 is used within customer tools (e.g., Web Dynpro) to invoke web services without having to generate a corresponding proxy for each of the web services that are being used. Furthermore, dynamic proxy 200 provides a model for the web services semantic to describe various web services interfaces, methods, and data types.

In one embodiment, dynamic proxy 200 is employed as a common dynamic API such that an application or user, such as WS consumer 212, does not need to generate or use proxy classes, but instead, WS consumer 212 can use dynamic proxy 200 as the common dynamic API to invoke web services 208 via WS endpoint 210. Stated differently, dynamic proxy 200 is independent of web services APIs and although it allows building applications, dynamic proxy 200 is not bound by any single or specific web service and can consume multiple web services using dynamic proxy 200. In one embodiment, to obtain knowledge about the web service parameters and operations, no need for consumer application 212 to generate or use classes/interfaces but instead, it can obtain such information from metadata structures via WSDL 206. Using this technique, various user interfaces (UIs) are built around web services such that they are independent of the web services as part of web service model 204. WSDL 206 and WS endpoint 210 are provided by WS provider 212. Furthermore, external object trees are used as web service parameters by implementing specific interface and object factory so that the web services client framework can gain access and instantiate objects.

To send and receive information, in one embodiment, the dynamic runtime uses generic objects so that in those cases where a web service can be used having to generate a proxy and/or write client application against a generated proxy. The metadata structures via WSDL 206, for example, provide information about the structure of the object tree. Since the type definition language for web services is XML Schema, the metadata that describes the request and response structure is also XML- or XML infoset-based. A metadata model is developed to provide an easy to use model that is based on metadata structure without covering one hundred percent of XML Schema. In the illustrated embodiment, various Object-to-XML and XML-to-Object features of schema are supported, such as simple content, model groups, and simple content restrictions.

In one embodiment, dynamic proxy 200 uses WSDL 206 to build a metadata model containing web services metadata provided by the web services description (e.g., description of interfaces, methods, parameters and types), such as the WS description provided via WSDL 206. Using a WS invocation API or WS endpoint 210, application 214 can invoke the loaded web service model via dynamic proxy 200. An object tree is then used to pass parameters, while the requests and responses are managed by client application 214. In one embodiment, the implementations of generic object interface (e.g., GenericObject interface) and generic object factory (e.g., GenericObjectFactory) are provided by the application developer or administrator. In one embodiment, dynamic proxy 200 is used in container-managed environments (e.g., Java 2 Platform, Enterprise Edition (J2EE)) as well as in standalone environments (e.g., Java 2 Platform, Standard Edition (J2SE)).

Figure 3:
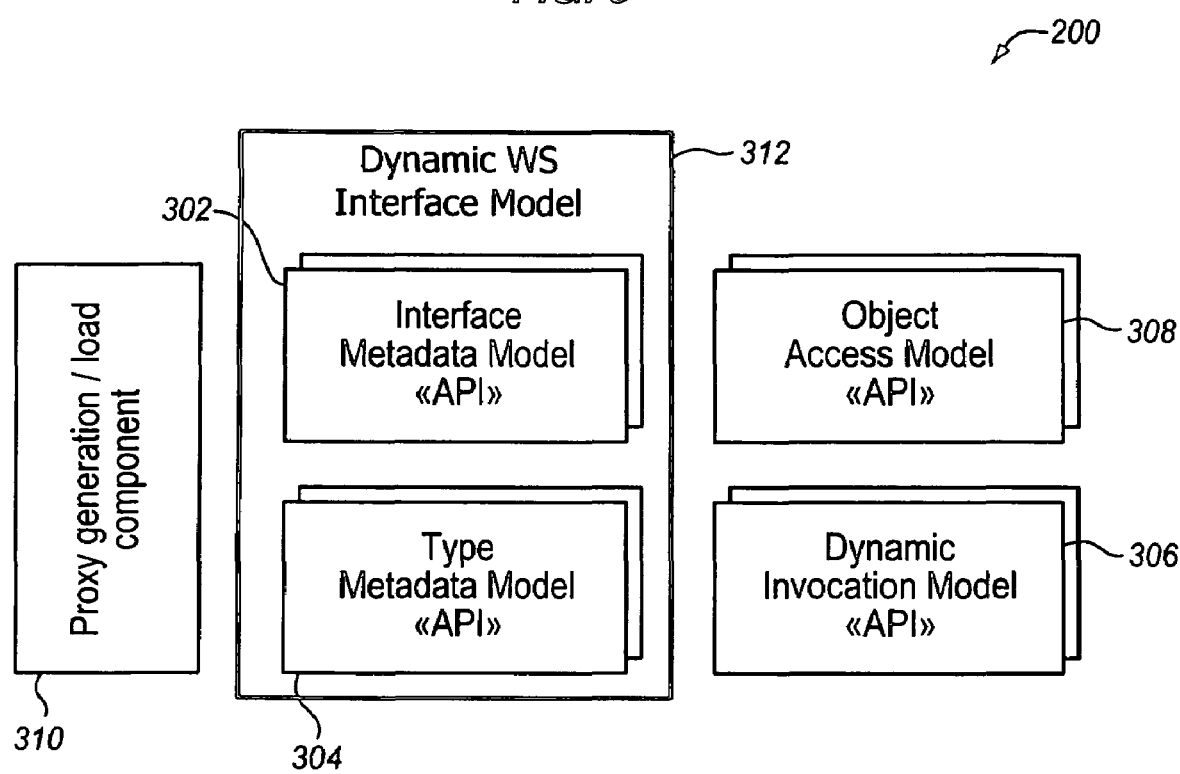
FIG. 3 illustrates an embodiment of a dynamic web service proxy.

FIG. 3 illustrates an embodiment of a dynamic web service proxy 200. The illustrated dynamic web service proxy 200 consists of type description metadata model (type metadata model) 304, web services interface metadata model (interface metadata model) 302, object access model (object access model) 308, dynamic invocation model (dynamic invocation model) 306, and proxy generation and metadata load component (proxy component) 310. The combination of type metadata model 304 and interface metadata model 302 represents dynamic web service interface model (dynamic interface model) 312. These components 302-310 are in communication with and coupled to each other. For example, dynamic interface model 312 communicates with object access model 308, dynamic invocation model 306, and proxy component 310 to provide dynamic proxy 200 and dynamic proxy-related services. Type metadata model 304, in one embodiment, allows for traversing of the web service date types and inspecting of their structure. Type metadata model 304 may be implemented as an API and loaded from a WSDL schema and contain the types used by a particular web service. Type metadata model 304 includes type metadata to describe a type metadata API and contain utility methods that return the required types, such as WS types and Java types, for specific web service type. For example the Java mapping for schema complex types is implementation of an interface (e.g., com-.sap.engine.services.webservices-.espbase.client.dynamic.content.GenericObject interface) and the respective Java mapping for xs:int schema type includes java.lang.Integer, while the type metadata API may be contained in a package (e.g., com.sap.engine.services.webservices.espbase.client.dynamic.types package).

Interface metadata model 302 provides an interface metadata API which contains web service interfaces and description of the interface methods and parameters. The parameter type descriptions may be found in type metadata model 302 or the type metadata API. In one embodiment, interface metadata model 302 includes interface metadata that describes an interface metadata API. Similarly, dynamic invocation model 306 provides a dynamic invocation API. The interface metadata API of interface metadata model 302 and the dynamic invocation API of dynamic invocation model 306 are provided in a package (e.g., com.sap.engine.services.webservices.espbase.client.dynamic package). In one embodiment, object access model 308 provides an object access API to describe the API for generic object access. The object access API is used by the runtime to serialize and/or deserialize external objects. Further, it contains those interfaces that the applications are to implement to provide access to their object trees. The object access API of object access model 308 is contained in a package (e.g., com.sap.engine.services.webservices.espbase.client.dynamic.content package).

Proxy component 310 is used to retrieve interface metadata model 302 and type metadata model 304 from a WSDL document. Proxy component 310 further includes various classes (e.g., GenericServiceFactory and ServiceFactoryConfig classes) from a package (e.g., com.sap.engine.services.webservices.espbase.client.dynamic package) that are used to instantiate dynamic web services clients and to configure their creation. Dynamic invocation 306 provides a dynamic invocation API to provide methods to invoke loaded web service models using generic object trees. In one embodiment, interface metadata model 302 and type metadata model 304 contain the web services client metadata. The objects sent or received by the client are herein referred to as generic object trees. These are the instances of the data types described in the metadata. The objects in such trees are either instances of one or more of interface and primitive Java types (e.g., com.sap.engine.services.webservices.espbase.client.dynamic.content.GenericObject interface or primitive Java types).

Figure 4:
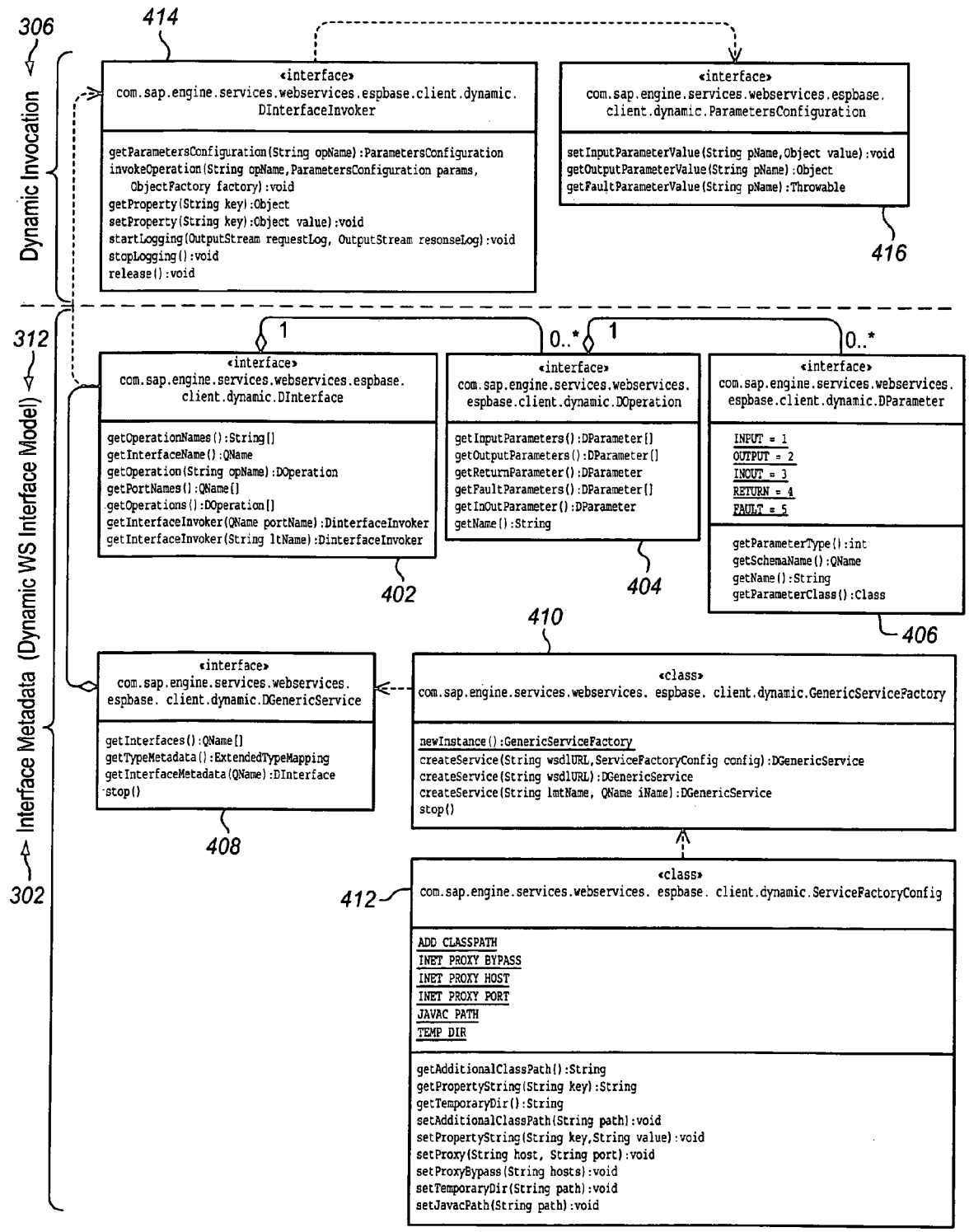
FIG. 4 illustrates an embodiment of a dynamic web service proxy including an interface metadata model and a dynamic invocation model to generate dynamic web services clients.

FIG. 4 illustrates an embodiment of a dynamic web service proxy 200 including an interface metadata model 302 and a dynamic invocation model 306 to generate dynamic web services clients. The interface metadata model 302 is part of a dynamic WS interface model 312, which further includes a type metadata model (e.g., type metadata model 304). In one embodiment, various interfaces, classes, objects, and components relating to the interface metadata model 302 and the dynamic invocation model 306 are used to generate a dynamic WS client or dynamic WS client API. For example, a dynamic web services client is provided by a factory object (e.g., com.sap.engine.services.webservices.espbase.client.dynamic.GenericServiceFactory factory object) at factory 410. Factory 410 may be used for both standalone (e.g., J2SE) and container-managed cases (e.g., J2EE). Furthermore, a method (e.g., GenericServiceFactory.newInstance( ) static factory method) at factory 410 may be used to create factory instances. Container-managed environment may be auto-detected by and/or at implementation.

After obtaining factory 410, an instance (e.g., DGenericService instance via interface 408) may be obtained by a user (e.g., developer/administrator) by using a method (e.g., GenericServiceFactory.createService( ) method) at factory 410 (further described with reference to FIG. 5). Such create methods are used to load a WSDL and create a dynamic proxy for the referenced web service. The factory configuration can be provided by an object (e.g., ServiceFactoryConfig object). When a dynamic API is used on the J2EE engine, the factory is configured by the J2EE engine and no configuration is necessary to be provided. For example, the following two methods for service creation at factory 410 may be available for a container-managed environment: (1) public DGenericService createService(String wsdlURL); and (2) public DGenericService createService(String logicalMetaTargetName, QName interfaceName). For example, the following method at factory 410 may be used for a standalone mode: public DGenericService createService(String wsdlName, ServiceFactoryConfig config).

In one embodiment, the interface metadata model 302 includes dynamic interface 402, dynamic operation 404, dynamic parameter 406, and dynamic generic service 408. The illustrated embodiment of the dynamic invocation model 306 includes dynamic interface invoker 414 and dynamic parameters configuration 416. A relationship between some of these components is illustrated in FIG. 5.

Figure 5:
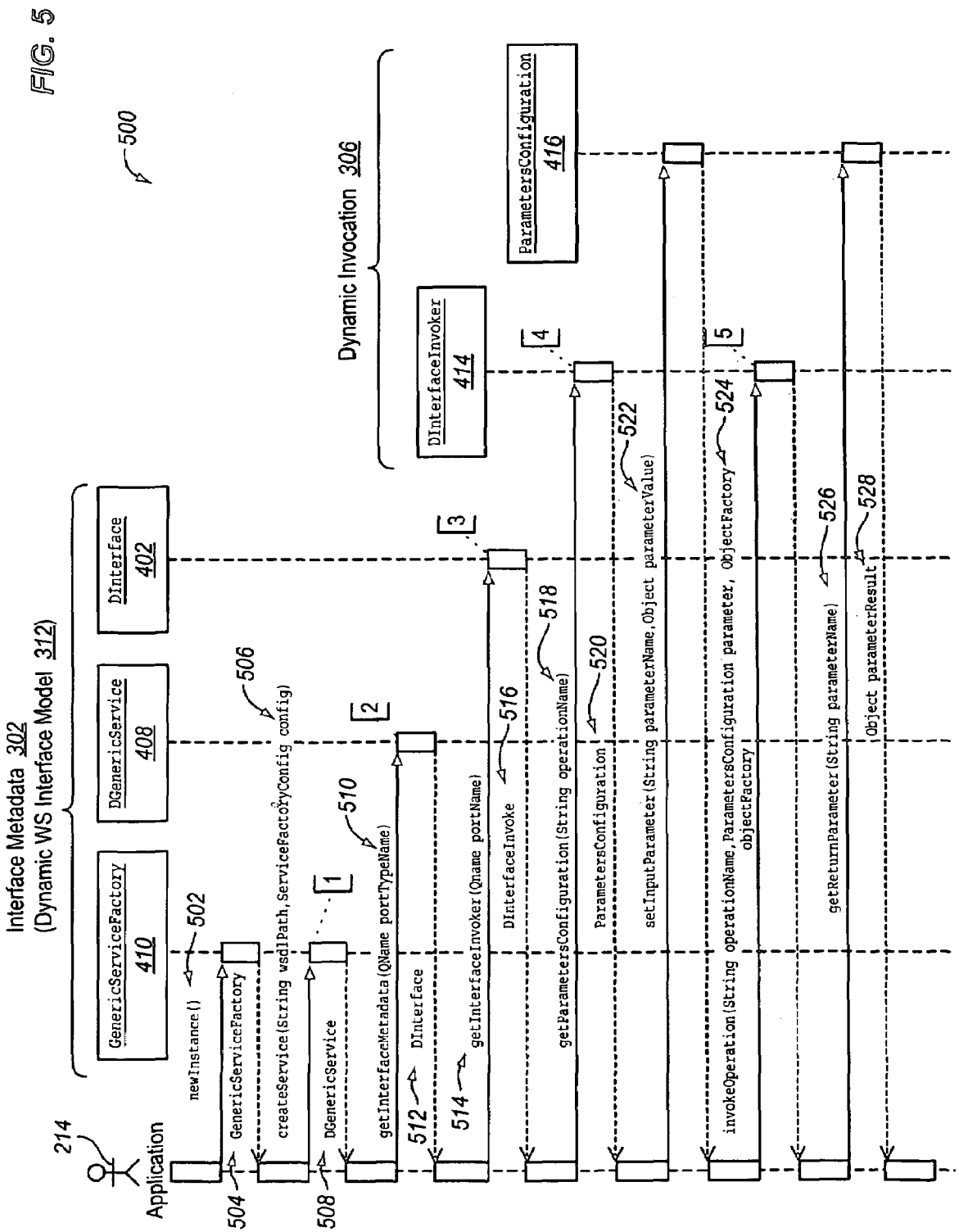
FIG. 5 illustrates a transaction sequence for dynamic web service proxy creation and invocation of a web service.

FIG. 5 illustrates a transaction sequence 500 for dynamic web service proxy creation and invocation of a web service. In one embodiment, a new instance is created 502 from a client application 214 of generic service factory 410 at interface metadata model 302 of dynamic interface model 312. In one embodiment, the generic service factory returns 504 to the application 214. A dynamic generic service (e.g., DGenericService) is crated 508 by the factory and returned to the application 214. In one embodiment, this dynamic generic service represents a dynamic proxy and the interfaces provided by the web service can be listed from there. Each PortType and Binding combination may be considered a separate interface. The PortType name may be used and communicated as an interface name 510. Using the dynamic proxy API, the web service metadata is separated from the invocation API. Each interface provides multiple ports (e.g., endpoints) for invocation. For example, a single interface with a single port (e.g., endpoint) may be used for web services.

A dynamic interface object (e.g., DInterface object) is returned 512 to application 214. In one embodiment, each interface metadata 302 is represented by an interface or object (e.g., com.sap.engine.services.webservices.espbase.client.dynamic.DInterface object). The DInterface object represents the information from a WSDL PortType and a WSDL Binding couple. Each interface object may contain a set of operations and each operation may contain multiple parameters. The operations and operation parameters are represented by a dynamic operation object (e.g., DOperation object) and a dynamic parameter object (e.g., DParameter object), respectively. The web service type metadata (e.g., type metadata 302 of FIG. 3) can be obtained by the DGenericService object by using a method (e.g., DGenericService.getTypeMetadata( ) method). Since the web service is represented by a single WSDL, the web service interfaces share a common type system.

Each WSDL port may be represented by a single web service interface invoker (e.g., getInterfaceInvoker (QName portName)) that is communicated from the application 214 to a DInterface 402. The invoker may not be thread safe, which means a single invoker may not be used for multiple calls at the same time. To decrease memory usage, invoker instances may be returned to the runtime for pooling by invoking a method (e.g., DInterfaceInvoker.release( )) method after the invocations are finished.

The invocation point names for a given web service interface are listed by the dynamic interface port name method (e.g., DInterface.getPortNames( ) method). A dynamic interface invoker object (e.g., DInterfaceInvoker object) is communicated 516 to the application 214. The DInterfaceInvoker object provides invocation functionalities for interface methods. For each operation, the DInterfaceInvoker object uses a parameter configuration object (e.g., ParametersConfiguration object) to transfer input parameters and operation results. These parameters are set or obtained using their names in the respective DParameter metadata entries. Using the operation name as a key, parameters configuration is invoked 518 prior to the operation invocation. Such parameters configuration is communicated 520 to the application 214. After setting inputs and input parameters 522, an operation method (e.g., invokeOperation method) is invoked to facilitate operation invocation 524 via parameters configuration 416 via dynamic. invocation model 306. A web services operation is then invoked and the parameters are inspected using the ParametersConfiguration object 526, 528.

Figure 6:
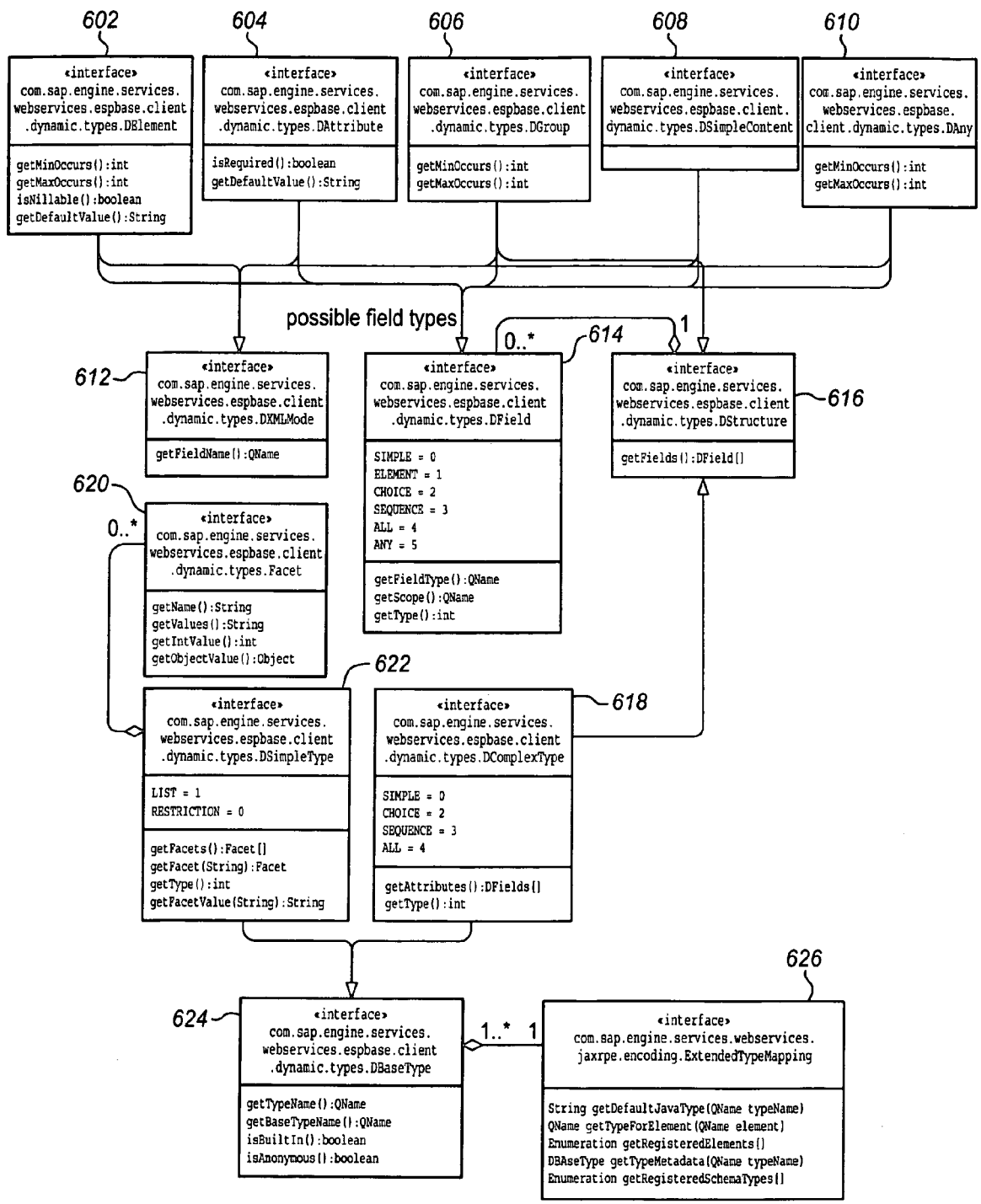
FIG. 6 illustrates an embodiment of a type metadata model.

FIG. 6 illustrates an embodiment of a type metadata model 304. In one embodiment, type metadata 304 describes the proper mode and how it is created from schema. To expose the web service types defined in a WSDL file of the web service, the dynamic proxy via a dynamic web service client API provides type metadata model 304 for data type description. Type metadata model 304 consists of interfaces used for describing web services types, while various fields in these interfaces are represented by appropriate getter methods. The implementations of these interfaces are provided by the core web services framework when type metadata model 304 is loaded. The types of type metadata model 304 are registered in special metadata registry (e.g., ExtendedTypeMapping) which act as a main tool for working with the type-related metadata.

In one embodiment, type metadata model 304 includes several type- and model-related interfaces, classes, components, and elements, such as type element 602, type attribute 604, type group 606, type simple content 608, type any 610, type XML node 612, type field 614, type structure 616, type complex type 618, type facet 620, type simple type 622, type base 624, and extended type mapping 626. Extended type mapping 626 is contained in dynamic generic service 408 of FIG. 4. In one embodiment, javax.xml.namespace.QName may be used to denote fully qualified XML names, which includes an xml local name and a namespace. Further, this composes an xml identifier to be used to name xml nodes, elements or attributes. This identifier may also be used in XML Schema to name XML Schema Definition (XSD) Types. The top level types defined in XML Schema may have unique qname to serve as a key to finding an XSD type metadata in the registry. The type system of XML schema contains two groups of types: simple types 622 and complex types 618. Simple types 622 are used to contain textual content without other XML tags. Complex types 618 are used to represent structured XML content, containing tags and attributes. Base type 624 in this type system (e.g., xsd:any-Type) can contain both the simple and complex contents and serves as the base type for both the simple and complex types 618, 622.

DBaseType 624 represents the base type for each type in the type system. It further represents xsd:anyType in type metadata model 304. This schema type represents values of any valid schema type in the type system. The following two kinds of types descend DBaseType 624: (1) DSimpleType 622 and DComplexType 618. The DSimpleType 622 and DComplexType 618 represent the two main XSD types of the simple types and the complex types, respectively. In the set of the known types, some types are built-in into the schema language, such as string, int., etc. These types are recognized by the isBuiltIn( ) flag. For example, this flag is set to true if the type represented is built-in.

DSimpleType 622 represents each of the schema simple types, including xsd:anySimpleType that is base type for each simple type in schema. DSimpleType 622 includes simple types that represent textual content. No simple type represents structured XML; however, the XML attributes can have simple types as their type. Examples of simple types include xs:string, xs:int, and xs:date. In these types, there are some that are built-in into the schema language and some that are derived by using restrictions. The restrictions applied to a derived type are aggregated into a set of Facet (name-value) pairs 620. For example, a simple type object may result with facet 1 set as true and facet 2 set as false. Further, runtime provides a method to validate a string value against simple type metadata which implements the validation of fields prior to sending them.

DComplexType 618 includes complex types that represent types having structured XML content. Each complex type describes a set of attributes and elements that describe the content of this type. The XML attributes may have simple content types and may not have cardinality. They can be optional or required. Each complex type contains structure of some elements. The type field can be used to get the structure type. For example, an ALL field indicates that elements in the structure can be of any order. When the ALL field is used, merely XML elements are allowed to be contained in the structure. A CHOICE field indicates that the elements in the structure are alternatives and merely one valid alternative between the elements is possible to be sent or received. A SEQUENCE field includes ordered set of elements. The fields of the structure are not merely XML elements. XML Schema allows for a group set of elements without creating a type. This set of elements is called group. Mixing elements and groups, and nesting groups can be used to create complex ordering of elements. This definition makes the complex type and the group structures, but the group is not a complex type and the complex type is not a group. A SIMPLE field includes those complex types that can extend simple types to achieve structures that contain simple type contents and attributes. In such cases, the structure of the complex type includes a SIMPLE set as its type. In case of such a structure, it may not contain those fields that are elements, and model groups. One other field that can be used is that of type DSimpleContent field. The simple content of a complex type may not have a name and may represent the textual content of the complex type. In this case, those complex types that are extended simple types are XML nodes with attributes and textual content.

DStructure 616 provides an interface to be used to describe a structural content. In XML Schema, a set of XML elements composes a structure. It contains a set of fields (e.g., DField). DGroup 606 represents a model group. Model groups are used often in XML Schemas to allow to group elements and create alternative groups of elements (using, for example, xsd:choice). Model groups are treated as separate structures and are regarded as embedded objects. Model groups have special names given by the loader which is unique and is used to set this model group value within the scope of the generic object that contains it. DField 614 includes a component that is used to represent fields and contents inside a complex type. The property "Type" contains information about the kind of the field. It is an element, a group or fields (e.g., ALL, CHOICE, SEQUENCE, etc.), other components (e.g., ANY, SIMPLE, etc.) can be detected by examining the value of this property. The QName of the field XSD type can be accessed using the "FieldType" property. Scope is a property of a DField interface 614 that contains the QName of the type that contains the field. This is used to quickly find the owner type of a specific field.

DElement 602 is used to extend DField 614 and is further used to represent an XML Element. It contains cardinality information and element names. DAny 610 is used to represent the special wildcard XSD component (e.g., xsd:any) which is used for representing any element into the xml content. DSimpleContent 608 is used to represent simple content when some a complex type extends a simple type. Because the entity is unnamed and is not an element, it can be a separate component. This component is stored as a field in the containing complex type. Once created, this model also allows for creating valid object trees using generic objects. Anonymous type handling at top level anonymous types may not be used. They can appear in the element or attribute declaration to specify local un-referencable type. These types have special unique local names, such as XPath of the XML node in which they are declared. The core web services framework may use these names to reference the anonymous types. Model groups have name property that is used by the core framework to set or receive their values. Their names are of local meaning within the structure of the type they belong to and the order in which they are declared. Each model group contains a scope property that references the ComplexType 618 to which it belongs.

Figure 7:
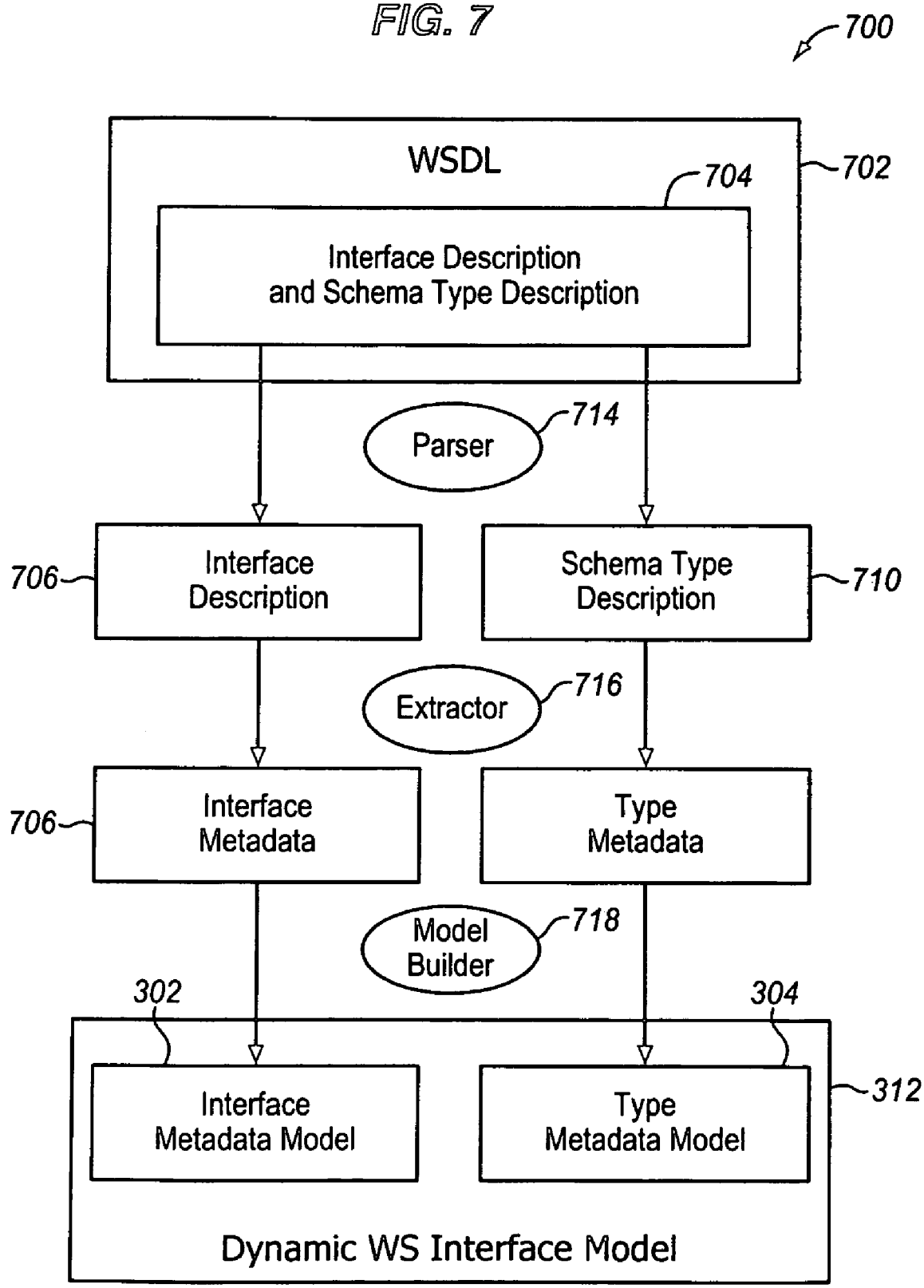
FIG. 7 illustrates an embodiment of a mechanism for generating a dynamic web services interface model.

FIG. 7 illustrates an embodiment of a mechanism 700 for generating a dynamic web services interface model 312. In the illustrated embodiment, WSDL 702 and its contents 704 are identified. The contents include interface description and schema type description 704. Using a parser or parsing module 714, the interface description and schema type description 704 are parsed into separate descriptions of interface description 706 and schema type description 710. In one embodiment, an extractor or extracting module 716 is used to extract interface metadata 708 from the interface description 706. Similarly, using the extractor 716, type metadata 712 is extracted from the schema type description 710. The parser 704 and extractor 716 may include certain factories or object factories to help perform the functions of parsing and extracting.

Once the interface and type metadata 708, 712 are obtained, a model builder or model building module 718 is used to generate the dynamic web services interface model 312. The dynamic web service interface model 312 includes an interface metadata model 302 and a type metadata model 304 having the interface metadata 708 and the type metadata 712, respectively. In one embodiment, the interface metadata model 302 and the type metadata model 304 describe an interface metadata API and a type metadata API, respectively. The dynamic WS interface model 312 provides a dynamic WS interface API. The interface metadata 708 may also contain the type metadata 712, which describes data types. The type metadata 712 is further used to examine the WS types and build parameters for dynamic WS invocation using a dynamic WS invocation model. The interface metadata 708 is used to examine WS interface and use the related information for a dynamic WS invocation API as described by the dynamic WS invocation model invocation API to dynamically invoke web services. The conventional JAX-RPC does not describe the types of web services.

Figure 8:
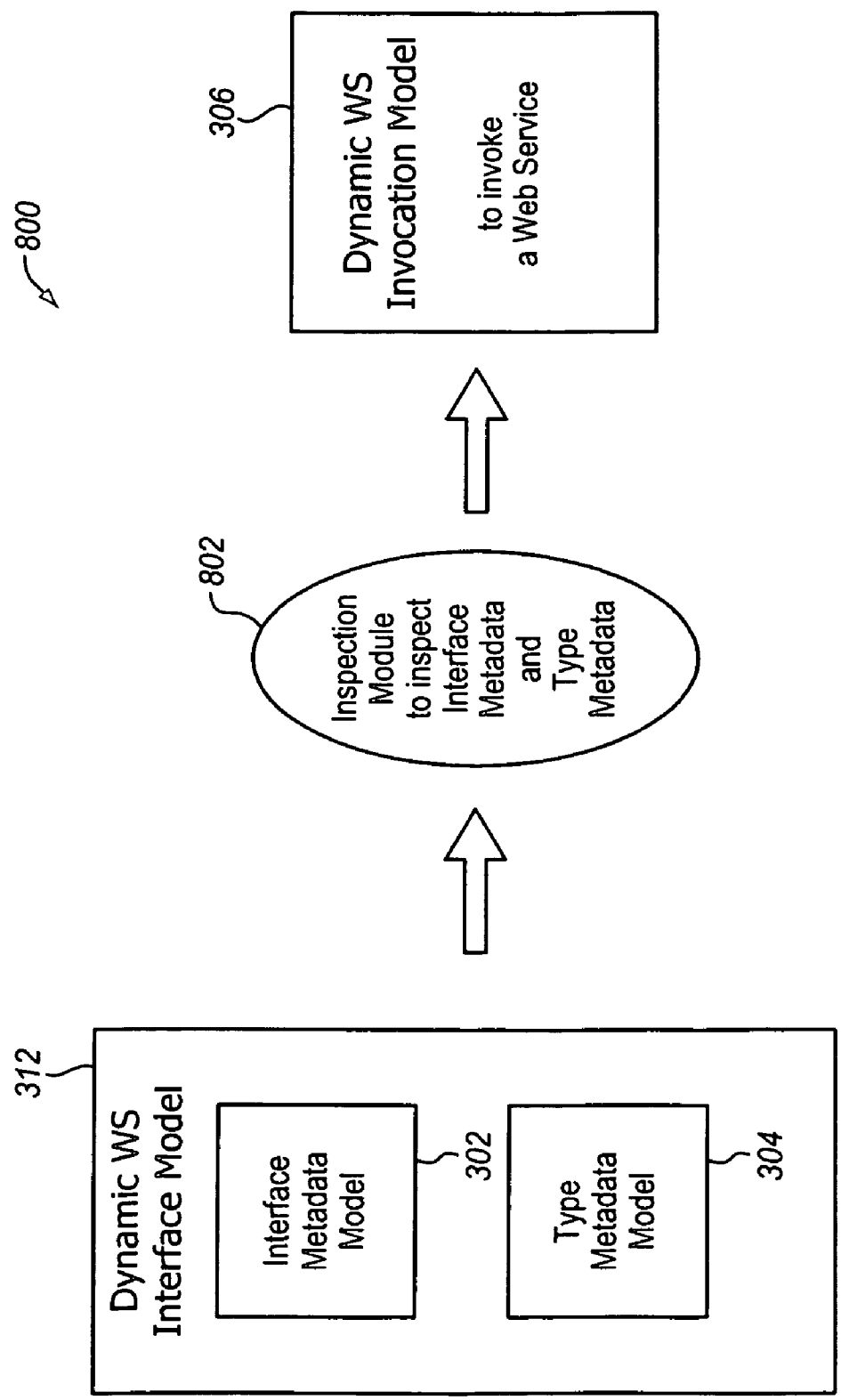
FIG. 8 illustrates an embodiment of a mechanism for invoking a web service.

FIG. 8 illustrates an embodiment of a mechanism 800 for invoking a web service. In one embodiment, continuing with FIG. 7, an inspector or inspection module 802 is used to inspect the interface metadata and type metadata at the interface metadata model 302 and the type metadata model 304, respectively. Once the metadata is inspected, the APIs of the respective metadata are used by a dynamic WS invocation model 306 to dynamically invoke a web service (e.g., without having to generate a corresponding proxy for the web service). Although the interface metadata and type metadata APIs are to describe WS invocation parameters and WS types, respectively, they are not limited as such and may also be used to build their own model (e.g., classes, parameters, etc.) around a WS interface.

Figure 9:
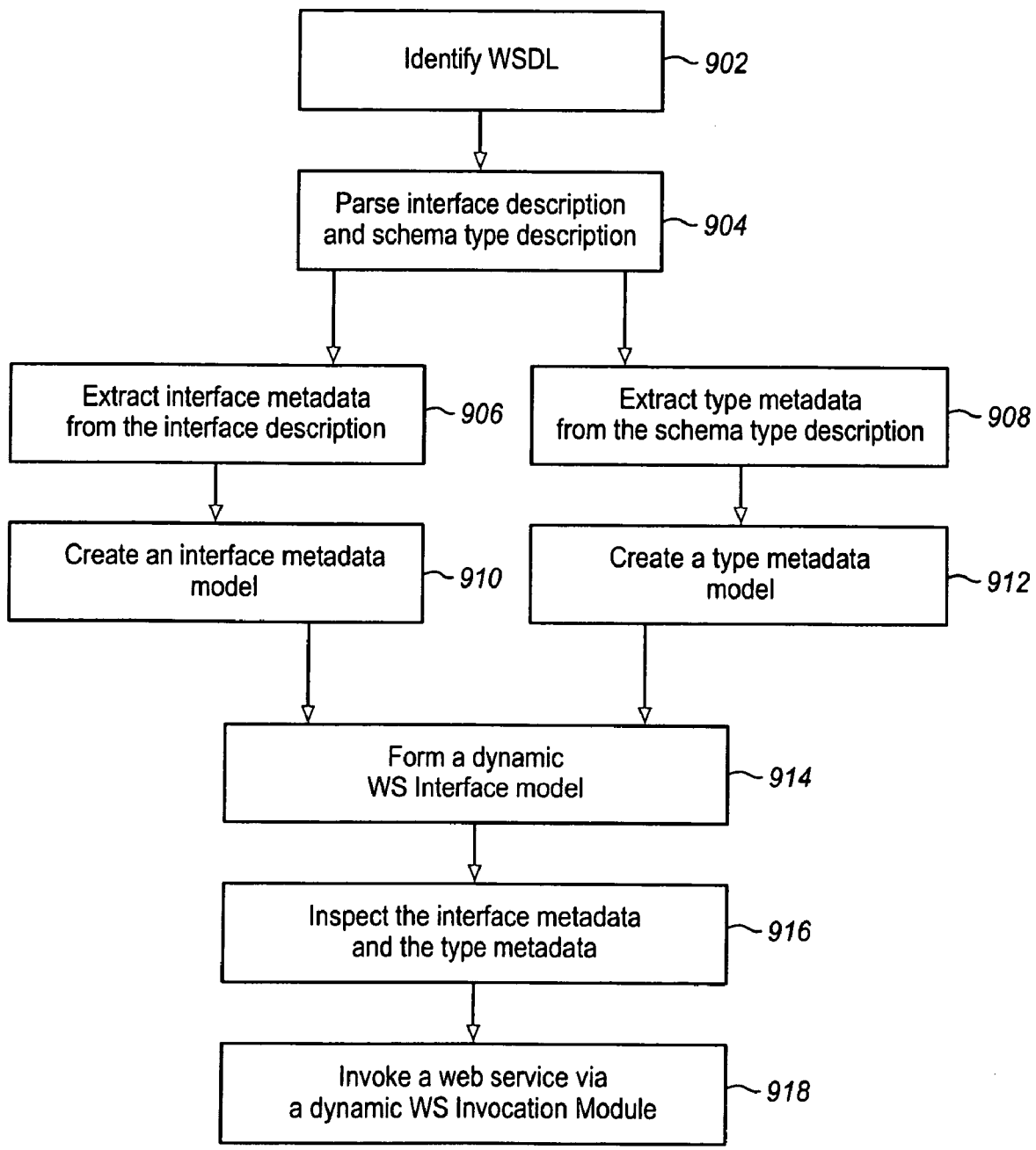
FIG. 9 illustrates an embodiment of process to generate dynamic web services models and invoke web services.

FIG. 9 illustrates an embodiment of process to generate dynamic web services models and invoke web services. At processing block 902, a WSDL file and its contents, such as interface description and schema type description, are identified. At processing block 904, the interface description and the schema type description are parsed using a parser. At processing blocks 906, 908, interface metadata and type metadata are extracted from the interface description and the schema type description, respectively, using an extractor. At processing blocks 910, 912, an interface metadata model and a type metadata model are created using the interface metadata and the type metadata, respectively, using a model builder.

In one embodiment, using the model builder, a dynamic WS interface model is generated containing the interface metadata and the type metadata at processing block 914. Each model describes a corresponding API, such as a dynamic interface API, an interface metadata API, and a type metadata API. At processing block 916, the interface metadata and the type metadata are inspected and the relevant information (such as innovation description and type description) and the APIs are used for a dynamic WS invocation model to dynamically invoke web services. At processing block 918, the dynamic invocation model dynamically invokes a web services (e.g., without having to create a corresponding proxy for the web service).

Figure 10:
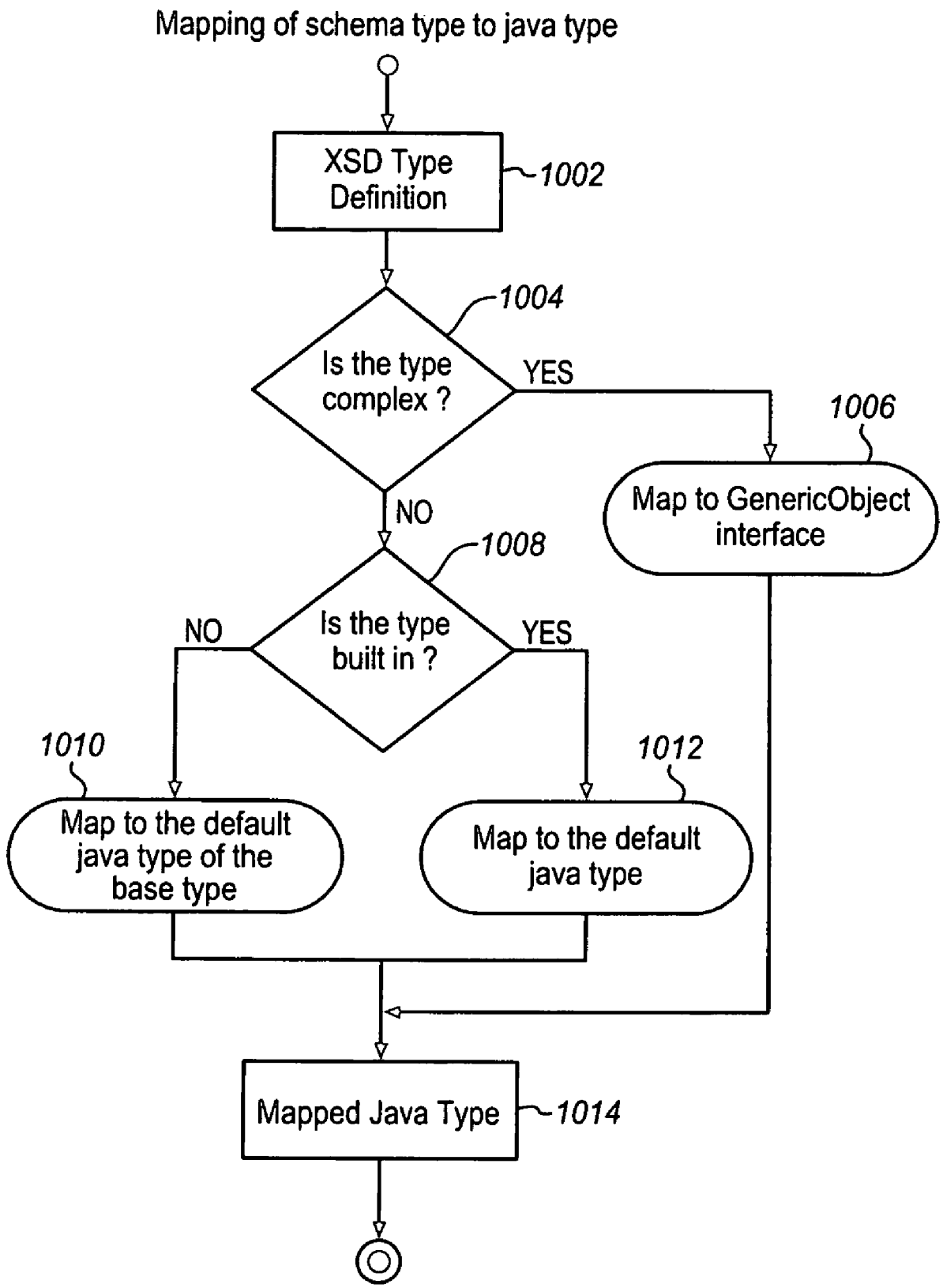
FIG. 10 illustrates an embodiment of a process for mapping schema types to Java types to find appropriate Java types for custom-defined schema types.

FIG. 10 illustrates an embodiment of a process for mapping schema types to Java types to find appropriate Java types for custom-defined schema types. In one embodiment, a process or algorithm is employed to map custom-defined types to Java types, and to further map custom simple types to the Java types of the base type, and to further map complex types to an interface generic object. At processing block 1002, an XSD type definition is identified. At processing block 1004, a determination is made as to whether the type definition is a type complex. If the type is the type complex, it is mapped to the generic object model or interface at processing block 1006. The Java type is then mapped to the schema type at processing block 1014.

Referring back to decision block 1004, if the type is not the type complex, a determination is made as to whether there is a type built-in at decision block 1008. If no type is built-in, the type is mapped to a default type of the base type at processing block 1010. The Java type is then mapped to the schema type at processing block 1014. If the type is built-in, the type is mapped to a default Java type at processing block 1012. The Java type is then mapped to the schema type at processing block 1014.

In one embodiment, the dynamic web service proxy handles web service data types by using a simplified XSD type system model to reference the web service data types used in a web service. Then, data type descriptions are loaded from the XML Schema that a WSDL document contains. The built-in schema types contain default mapping to the Java built-in types. This way, the simple data types have existing mapping in Java and the custom defined schema types are mapped to the existing Java types or to the generic object interface if they are complex structures. Since new Java classes are not generated to represent the custom-defined complex types, the user (e.g., developer/administrator) provides their implementation to the generic object interface. The generic object interface may provide template methods for setting attributes and field values for each complex type instance.

In one embodiment, the dynamic web service client implementation using the dynamic proxy provides default implementation to this interface generic object implementation (e.g., GenericObjectImpl). This implementation simple contains two hash tables that are used for attribute and field storage. Once the implementation is performed, the client may send a web service request, while the serialization algorithm uses various interface methods to get the required fields and attributes for XML serialization. When receiving the response, the dynamic client uses a factory for result object creation. The factory creates generic object implementation objects that are used to deserialize the result message. The dynamic proxy implementation provides a default implementation for this factory that is then used to create the generic object implementation. The dynamic proxy uses fixed default mapping for the built-in schema types. These are the types provided by the core schema specification. Their Java mapped types may be used to send and receive values of specific schema types.

Figure 11:
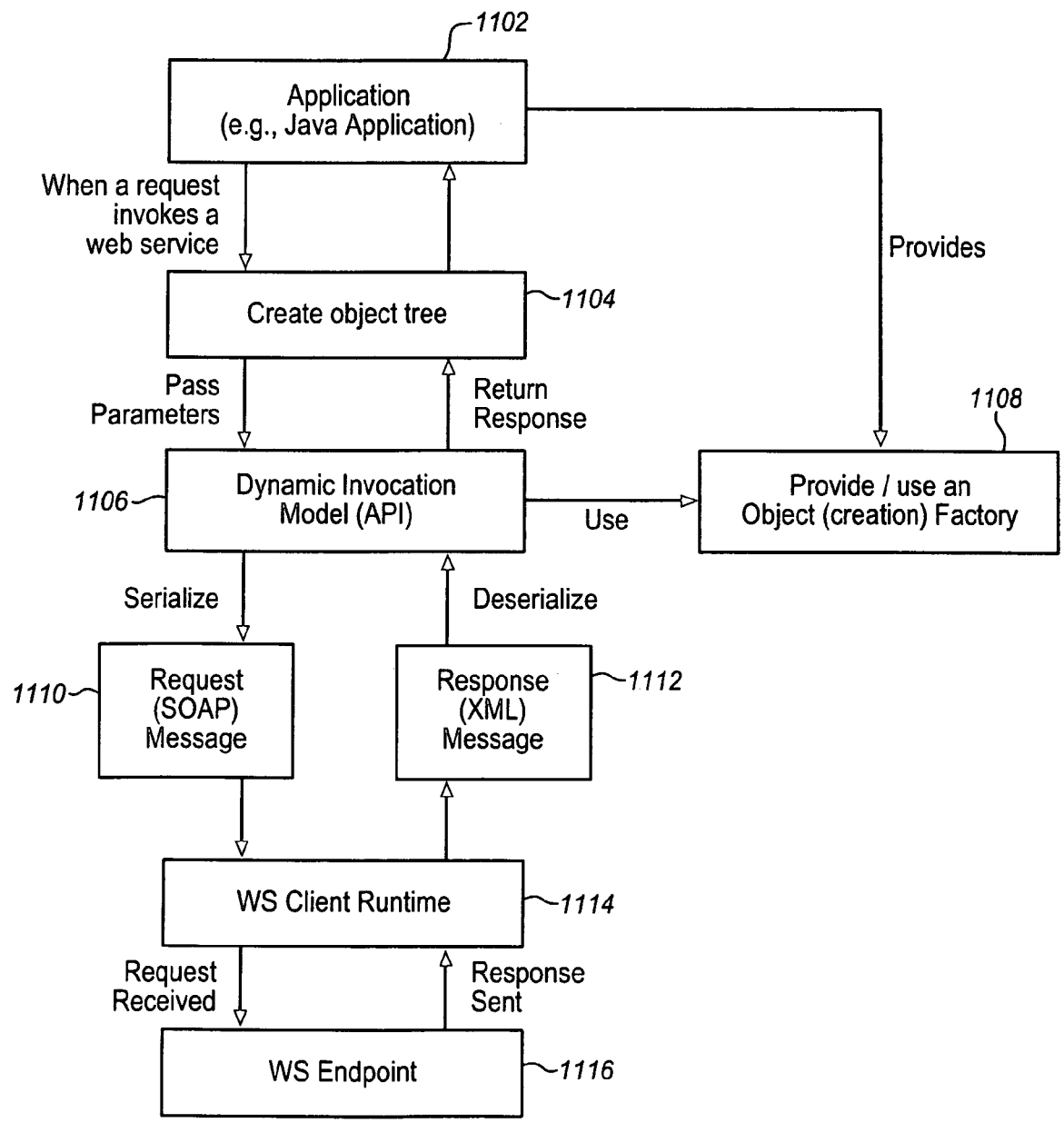
FIG. 11 illustrates an embodiment of a process for generating and using generic objects when invoking a web service.

FIG. 11 illustrates an embodiment of a process for generating and using generic objects when invoking a web service. At block 1102, an application (e.g., Java application) provides a request for invoking a web service. At block 1104, an object tree is created. The parameters of the object tree are passed on to a dynamic invocation model via a dynamic invocation API to invoke the web service at block 1106. The dynamic invocation model uses an object creation factory at block 1108 to create generic objects that are contained in a generic object access model and accessed via a generic object API. The factory at block 1108 may be provided by the application at block 1102.

The request message (e.g., SOAP request message) is formed as the information is serialized at block 1110. The request message is received at WS endpoint at block 1116 via the WS client runtime at block 1114. A response is then formed and sent from the WS endpoint at block 1116 at the WS client runtime at block 1114. A response message (e.g., XML response message) is formed and deserialized at block 1112. The response message is communicated to the dynamic invocation model at block 1106. The return message is the posted back to the application at block 1102 via the object tree at block 1104.

Figure 12:
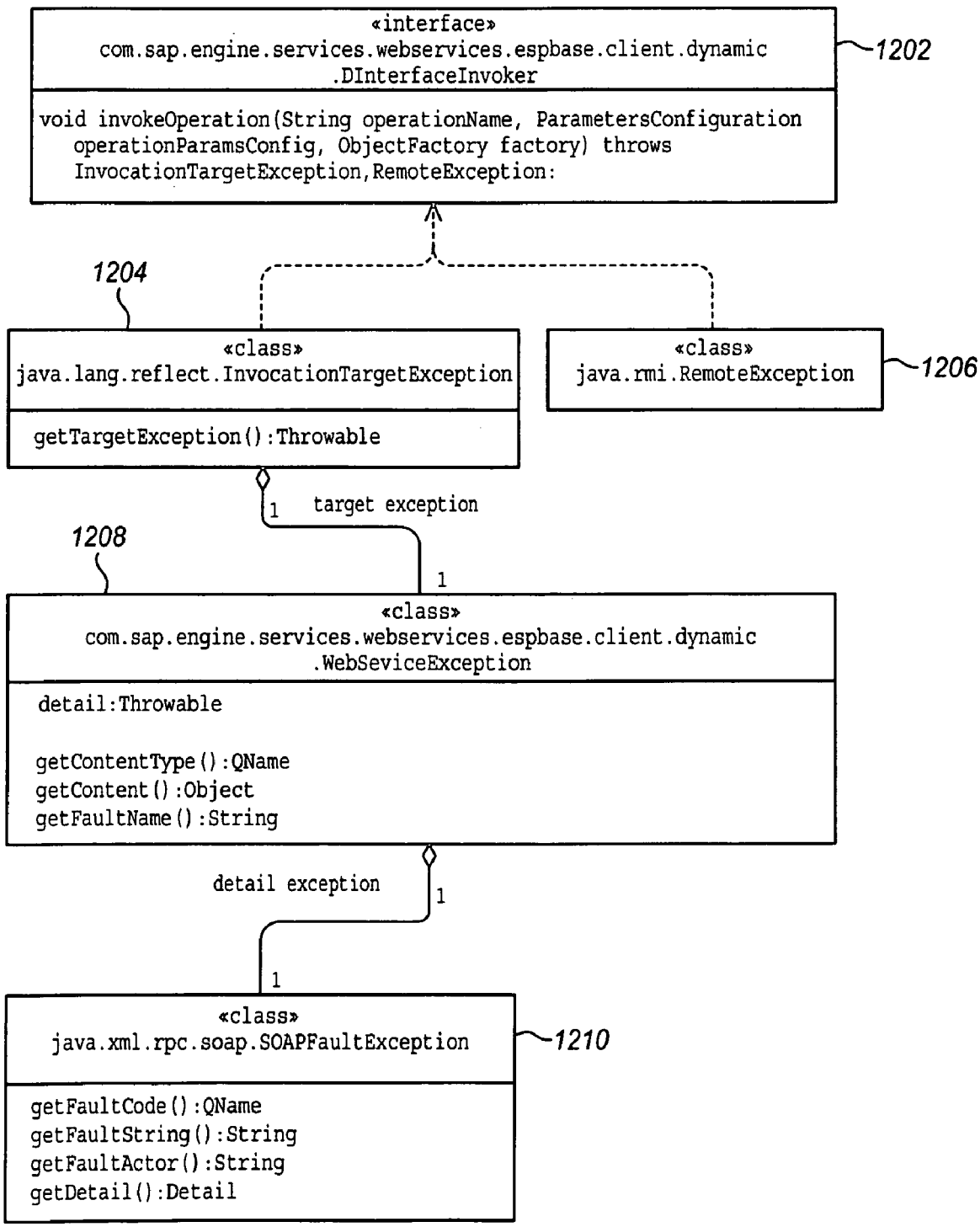
FIG. 12 illustrates an embodiment of an exception and fault-handling structure.

FIG. 12 illustrates an embodiment of an exception and fault-handling structure 1200. When a web service method is invoked via an interface invoker 1202, two types of exceptions are expected to occur. The two exceptions include (1) a communication and serialization exception, and (2) faults returned by the web service being invoked. With regard to the communication and serialization exception, the problem that leads to this exception occurs when one of the sides fails upon the transmission of a SOAP message. The communication may then be aborted and either the complete message is not sent or the response message is not read or not processed. These problems are grouped as remote exceptions (e.g., RemoteException) 1206 thrown by the invoke method when a communication problem occurs in the invocation process. For example, both exceptions extend java.rmi.RemoteException, while java.rmi.MarshalException indicates that the XML serialization has failed and java.rmi.UnmarshalException indicates that the XML deserialization has failed.

Referring now to the second type of exception, in which faults are returned by the web service, the request message is sent by the client (e.g., invoker) but the web service returns a SOAP Message indicating that the request message could not be processed by the web service. In this case, the fault is returned by the web service application itself or by the server framework. This group contains those cases where the server returns s SOAP Fault. In such cases, the thrown exception by the invoke method is regarded as an invocation target exception (e.g., InvocationTargetException) that is thrown when the invoked web service returns a SOAP fault. The application developer should handle the both cases accordingly.

A SOAP protocol may allow the web services developers to add web service-specific exceptions to the web service interfaces. These exceptions may be described in the web service metadata as fault parameters. These exceptions are returned as SOAP Faults with special content in their detail element. The client may then deserialize these exceptions. A web service exception class (e.g., WebServiceException) 1208 is used to serve as a container for these web service-specific exceptions. This web service exception class may contain the original SOAP Fault payload 1210, particularly if the application developer needs it. In one embodiment, the web service exception 1208 is contained as target, merely when faults returned by the web service are described in the web service interface. If the returned SOAP Fault by the server is not described in the WSDL, the target of the invocation target exception 1204 includes a SOAP Fault exception (e.g., SOAPFaultException). Using the illustrated embodiment of an exception and fault-handling mechanism, as described in this structure 1200, a proper handling of invocation faults is provided to create reliable web service client applications.

In one embodiment, to perform various embodiments of the present invention, a server or node (e.g., J2EE server) is employed, which supports Enterprise Java Bean ("EJB") components and EJB containers (at the business layer) and Servlets and Java Server Pages ("JSP") (at the presentation layer). A virtual machine (VM) may include a Java virtual machine (JVM) to host the server or server node. It is understood that processes taught by the discussion above can be practiced within various software environments such as, for example, object-oriented and non-object-oriented programming environments, Java based environments (such as a J2EE environment or environments defined by other releases of the Java standard), other environments (e.g., a NET environment, a Windows/NT environment each provided by Microsoft Corporation), and the like.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

One or more modules within or associated with the dynamic web service proxy (such as dynamic proxy 200 of FIG. 2) and its APIs (e.g., dynamic proxy API), models, components, and other elements, may include hardware, software, and a combination thereof. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above. The code may also be downloaded from a remote computer (e.g., a server) to a requesting computer (e.g., a client) by way of data signals embodied in a propagation medium (e.g., via a communication link (e.g., a network connection)).

Figure 13:
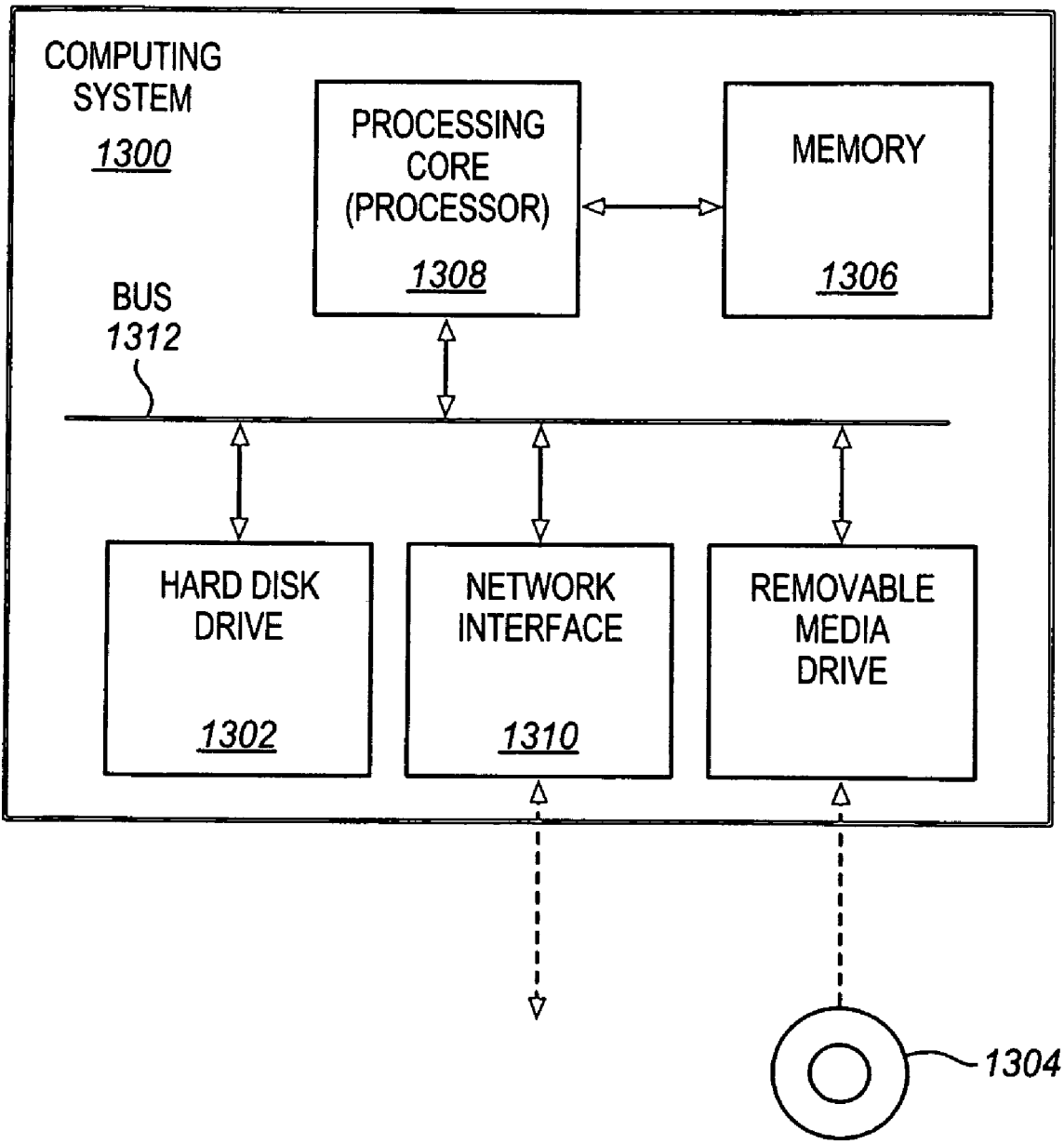
FIG. 13 illustrates a computing system.

FIG. 13 illustrates a computing system 1300. Computing system 1300 may be used for implementing one or more embodiments of the present invention and for executing program code stored by an article of manufacture. It is important to recognize that the computing system 1300 represents merely of various computing system architectures that can be used for the same purposes. The applicable article of manufacture may include one or more fixed components (such as hard disk drive 1302 or memory 1306) and/or various movable components, such as compact disk (CD) ROM 1304, a compact disc, a magnetic tape, and the like. To execute the program code, typically instructions of the program code are loaded into RAM 1306. Then, processing core 1308 executes the instructions. A processing core may include one or more processors and a memory controller function. A virtual machine or "interpreter" (e.g., a JVM) may run on top of the processing core (architecturally speaking) to convert abstract code (e.g., Java bytecode) into instructions that are understandable to the specific processor(s) of processing core 1308. Computing system 1300 further includes network interface 1310 and bus 1312 to connect to other systems via a network and to have various components communicate with each other, respectively.

Figure 14:
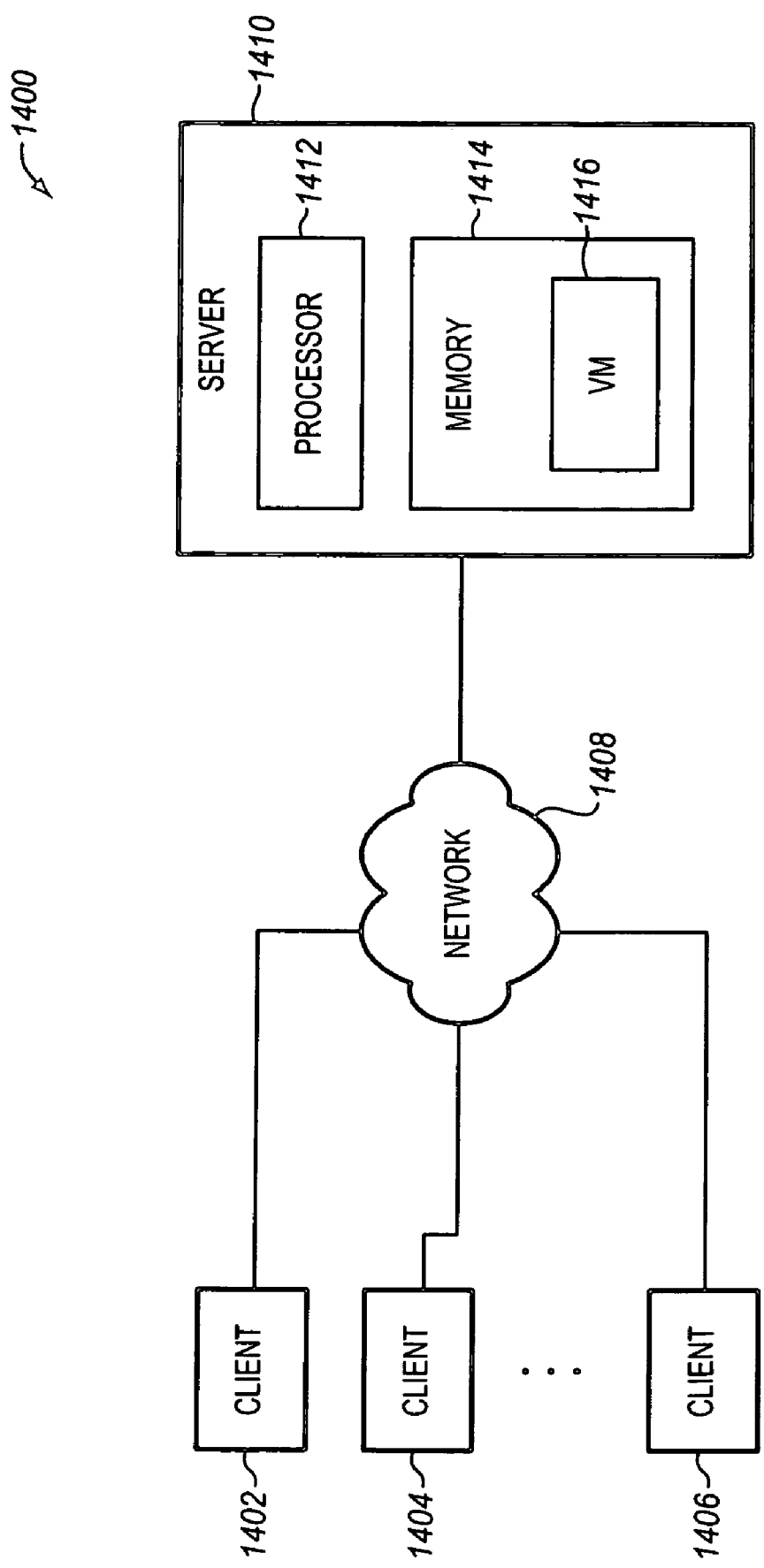
FIG. 14 illustrates a client/server network system.

FIG. 14 illustrates a client/server network system 1400. As illustrated, network 1408 links server 1410 with client systems 1402-1406. Server 1410 includes programming data processing system suitable for implementing apparatus, programs, and/or methods in accordance with one or more embodiments of the present invention. Server 1410 includes processor 1412 and memory 1414. Server 1410 provides a core operating environment for one or more runtime systems (e.g., VM 1416) at memory 1414 to process user requests. Memory 1414 may include a shared memory area that is accessible by multiple operating system processes executing in server 1410. For example, VM 1416 may include an enterprise server (e.g., a J2EE-compatible server or node, Web Application Server developed by SAP AG, WebSphere Application Server developed by IBM Corp. of Armonk, N.Y., and the like). Memory 1414 can be used to store an operating system, a Transmission Control Protocol/Internet Protocol (TCP/IP) stack for communicating over network 1408m, and machine executable instructions executed by processor 1412. In some embodiments, server 1410 may include multiple processors, each of which can be used to execute machine executable instructions.

Client systems 1402-1406 may execute multiple application or application interfaces. Each instance or application or application interface may constitute a user session. Each user session may generate one or more requests to be processed by server 1410. The requests may include instructions or code to be executed on a runtime system, such as VM 1416, on server 1410 and its components and modules as described throughout this document.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
    identifying description content of a web services description file;
    parsing the description content into a first description content and a second description content;
    extracting a first metadata from the first description content, and a second metadata from the second description content, wherein the first metadata includes interface metadata, and the second metadata includes type metadata;
    inspecting the first metadata at an interface metadata model, and the second metadata at a type metadata model; and
    using results of the inspection of the first metadata and the second metadata, generating a dynamic web service proxy to provide common access to multiple web services via a single dynamic web services interface, wherein the dynamic service proxy is independent of types of the multiple web service and is not bound by protocols associated with the multiple web services.

2. The method of claim 1, further comprising
    creating a dynamic web services interface model via the first metadata and the second metadata; and
    creating a dynamic web services invocation model having the dynamic web services interface, the invocation model in communication with the dynamic web services interface model.

3. The method of claim 1, wherein the first description content comprises interface description, and the second description content comprises schema type description.

4. A system comprising:
    a computer system including an application server, the application server further having
    an identification module to identify description content of a web services description file;
    a parser to parse the description content into a first description content and a second description content;
    an extractor to extract a first metadata from the first description content, and a second metadata from the second description content, wherein the first metadata includes interface metadata, and the second metadata includes type metadata;
    an inspection module to inspect the first metadata at an interface metadata model, and the second metadata at a type metadata model; and
    a dynamic proxy generator to generate a dynamic web service proxy to provide common access to multiple web services via a single dynamic web services interface, wherein the dynamic service proxy is independent of types of the multiple web service and is not bound by protocols associated with the multiple web services, the dynamic web service proxy is generated using results of the inspection of the first metadata and the second metadata.

5. The system of claim 4, further comprising:
    a first model builder to create a dynamic web services interface model via the first metadata and the second metadata; and
    a second model builder to create a dynamic web services invocation model having the dynamic web services interface, the invocation model in communication with the dynamic web services interface model.

6. An article of manufacture comprising a machine-accessible storage medium having instructions which, when executed, cause a machine to:
    identify description content of a web services description file;
    parse the description content into a first description content and a second description content;
    extract a first metadata from the first description content, and a second metadata from the second description content, wherein the first metadata includes interface metadata, and the second metadata includes type metadata;
    inspect the first metadata at an interface metadata model, and the second metadata at a type metadata model; and
    using results of the inspection of the first metadata and the second metadata, generate a dynamic web service proxy to provide common access to multiple web services via a single dynamic web services interface, wherein the dynamic service proxy is independent of types of the multiple web service and is not bound by protocols associated with the multiple web services.

7. The article of manufacture of claim 6, wherein the instructions which, when executed, further cause the machine to:
    create a dynamic web services interface model via the first metadata and the second metadata; and
    create a dynamic web services invocation model having the dynamic web services interface, the invocation model in communication with the dynamic web services interface model.

* * * * *